Dec. 18, 1934.   R. T. PIERCE   1,984,493

ELECTRICAL TESTING APPARATUS

Filed June 1, 1931

Inventor:
Raymond T. Pierce,
By Byrnes, Townsend & Cotter,
Attorneys.

Patented Dec. 18, 1934

1,984,493

UNITED STATES PATENT OFFICE 1,984,493

ELECTRICAL TESTING APPARATUS

Raymond T. Pierce, Millburn, N. J., assignor to Weston Electrical Instrument Corporation, Newark, N. J., a corporation of New Jersey Application June 1, 1931, Serial No. 541,454

8 Claims. (Cl. 175—183)

This invention relates to electrical testing apparatus, and particularly to simple and convenient apparatus for testing the circuits and/or the operation of electrical apparatus of the type including motors operated from the usual light and power circuits.

An object of the invention is to provide a compact testing apparatus for making a complete electrical investigation of motor-operated devices such as electrical refrigerators, oil burners and similar electrical apparatus. A further object of the invention is to provide a compact testing apparatus of the type stated which may be conveniently connected in circuit with the apparatus to be tested. More specifically, an object is to provide testing apparatus for connection to a power line, and having terminals for receiving the usual terminal connectors employed for connecting the apparatus under investigation to the power line.

Figure 1:
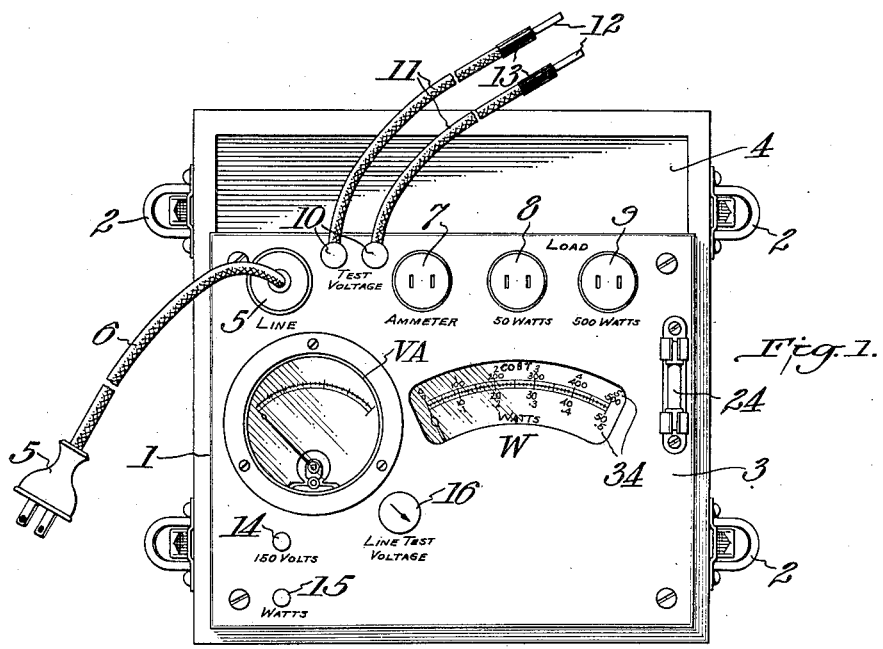
Figure 2:
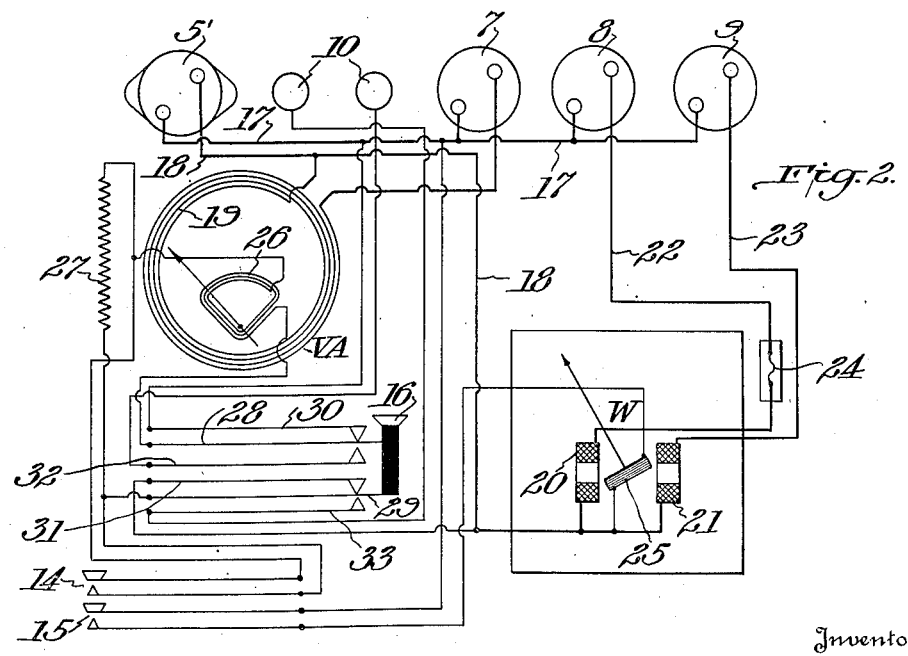

These and other objects of the invention will be apparent from the following specification, when taken with the accompanying drawing, in which, Fig. 1 is a plan view of one embodiment of the invention, the cover of the instrument case being removed, and Fig. 2 is a diagram of the electrical circuits of the apparatus.

In the drawing, the reference numeral 1 identifies the carrying case which is provided with latches 2 for the attachment of a shallow cover, not shown.

The panel 3 of the casing is of somewhat smaller size than the casing 1, thus leaving a compartment 4 in which the connecting cords, hereinafter described, may be carried. The panel 3 is provided with a socket for receiving one plug connector 5 of a flexible conductor 6 which carries at its other end a similar plug 5 for insertion in the customary type of wall socket of an electric light and power line. The panel is also provided with a series of sockets 7, 8 and 9 for receiving the plug by which the apparatus under test is normally connected to the wall socket. As indicated by appropriate legends "Ammeter", "50 Watts" and "500 Watts", adjacent the sockets 7, 8 and 9, respectively, different test circuits which will be described hereinafter are established in accordance with the particular socket to which the load apparatus is connected. Terminals 10 are mounted on the panel 3 for receiving flexible conductors 11 which terminate in probe electrodes 12 that project beyond shells 13 of insulating material.

A combination voltammeter VA and wattmeter W are carried on the instrument panel 3, also switches 14, 15 and 16 for determining the circuit connections to the instruments. Legends "150 Volts" and "Watts" adjacent switches 14 and 15, respectively, indicate that these switches are to be depressed to connect the 150 volt range of instrument VA or the wattmeter W in circuit. Legends "Line" and "Test" adjacent the two positions of switch 16 indicate that this switch may be operated to connect the voltmeter in circuit either with the power line or with the test terminals 10.

In the diagram, Fig. 2, the various circuit elements are shown in the relative positions in which the physical elements appear in the illustration of the testing apparatus, and the wires by which the load current is transmitted are shown by relatively heavy lines.

One terminal of the plug base or socket 5' which receives a terminal of the flexible connector 6 is connected to one terminal of each of the sockets 7, 8 and 9 by a jumper or connector 17. The second current carrying conductor 18 joins the other contact of the socket 5' to the ammeter winding 19 of the voltammeter VA and to the 50 and 500 watt field coils 20, 21, respectively, of the wattmeter W, the opposite terminals of these coils being connected to the other terminals of the sockets 8 and 9 by leads 22, 23, respectively. To avoid damage to the coil 20 in the event that an excessive load is connected across socket 8, the lead 22 includes a fuse 24 which, as shown in Fg. 1, is mounted in a clip on the face of panel 3. The moving coil of the wattmeter is connected across the current carrying leads 17, 18 through the switch 15 which is normally held in open position.

The voltmeter winding 26 of the voltammeter VA is connected, in series with the multiplier resistance 27, across the two contact arms 28, 29, respectively, of the double pole double throw switch 16. One pair of similarly disposed contacts 30, 31 of the switch 16 are connected to the leads 17, 18, respectively, and the second pair of contacts 32, 33 are connected to the test voltage terminals 10. The contacts of the switch 14 are connected to opposite terminals of the multiplier resistance 27 and, when the switch 14 is closed, short circuit the resistances for the measurement of voltage within the lower operating range of the instrument VA.

For purposes of illustration, it is assumed that the electrical apparatus to be investigated includes two motors which are rated at less than 50 watts and 450 watts, and that the starting equipment includes transformers which step up a line voltage of about 110 volts to approximately 500 volts.

To measure the current consumption, the socket 5' of the testing apparatus is connected to a power line socket by the flexible connector 6, the switch 16 is turned to "test voltage" position to open the circuit through winding 26 of the voltammeter, and the connector plug of the electrical apparatus is inserted in the "ammeter" socket 7. The current supplied to the apparatus traverses the ammeter winding 19 and the deflection of the pointer indicates the total current taken by the apparatus. Line voltage may then be measured by transferring the apparatus plug to socket 9 and turning switch 16 to "line" position. If the instrument VA indicates less than 150 volts, switch 14 is depressed to permit a reading of the voltage on the lower range scale.

The total load may then be measured by depressing switch 15 to connect the wattmeter moving coil 25 in circuit.

Measurements for current consumption and power consumption of the separate motors are made in like manner by first opening the circuit of one of the motors at the connections box of the electrical apparatus. In testing the motors separately, care is to be taken that the apparatus plug is placed in the "500 watt" socket 9 when the larger motor is under test. If the plug is inadvertently placed in socket 8, the wattmeter is protected by the fuse 24.

The voltages established across component parts of the electrical apparatus may be measured by turning switch 16 to "test" position and placing the contacts 12 in contact with the terminals of the part in question.

Tests for grounds or open circuits can also be made with the probe electrodes 12.

In addition to the watts graduations, the wattmeter W may be, and preferably is, provided with sets of graduations 34 which are based upon the cost, per hour, of operation upon a basis of a charge of ten cents per kilowatt-hour. For other rates, the cost of operation is readily determined from the scale reading by multiplying by the ratio of the actual rate to the assumed rate of ten cents. This feature is particularly desirable in a testing set intended for use in the servicing of household equipment as the owner will frequently place greater reliance upon such a measurement of the operating cost than he will upon a statement of cost based upon the measured watts consumption.

While the invention has been described in connection with a test set that was designed for use with a type of household apparatus that includes two motors, the test set may be employed to investigate other apparatus which includes one or more motors or other current consuming devices and that, by appropriate choice of the measuring instruments, testing apparatus may be constructed for investigating the performance of electrical equipment of various types and of different current and power consumption. Both for compactness and for economy, the use of combination or double range instruments is desirable, but it is to be understood that the invention is not restricted to the use of a voltmeter and an ammeter that have a common moving system.

I claim:

1. Testing apparatus adapted to be connected between a source of electrical energy and an electrical appliance operated from said source, said apparatus comprising at least one receptacle adapted to receive the plug terminal of the electrical appliance, a pair of terminals adapted to be connected to the source of energy, connections including an ammeter field winding between said pair of terminals and a receptacle, a voltmeter field winding, and connections shunting said voltmeter winding across said pair of terminals, said ammeter and voltmeter windings constituting parts of a voltammeter having a single moving system, and said voltmeter winding connections including a switch; whereby the source voltage may be measured when the appliance is not connected to said testing apparatus, and the current consumption may be measured by opening said voltmeter switch and connecting the appliance to the receptacle associated with said ammeter winding.

2. Testing apparatus adapted to be connected between a source of electrical energy and an electrical appliance operated from said source, said apparatus comprising at least one receptacle adapted to receive the plug terminal of the electrical appliance, a pair of terminals adapted to be connected to the source of energy, connections including an ammeter field winding between said pair of terminals and a receptacle, a voltmeter field winding, and connections shunting said voltmeter field winding, and connections shunting said voltmeter winding across said pair of terminals; the said connections including a multiplier resistance and a switch for short-circuiting the same.

3. Testing apparatus for investigating the operation of an electrical appliance of the type having a plug terminal for establishing connection to a power line, said apparatus comprising a portable casing having a receptacle for receiving connections from a power line, a pair of receptacles for receiving the plug terminal of the appliance, a voltmeter, an ammeter, a wattmeter, and a network of circuit connections for supplying current from said power line receptacle to said pair of receptacles, said network including the windings of said instruments and switch means for rendering a plurality of said instruments operative or inoperative.

4. Testing apparatus for investigating the operation of an electrical appliance, said apparatus comprising a receptacle for receiving connections from a power line, a pair of receptacles for receiving the plug terminal of the appliance, a voltmeter, an ammeter, a wattmeter, and a network of circuit connections for supplying current from said power line receptacle to each of said appliance receptacles; said network including the current windings of said measuring instruments as series elements of the connections by which current for operation of the appliance passes from the power line receptacle to that receptacle of said pair to which the appliance is connected, and including switch means controlling the connection of the voltage windings of said instruments across the contacts of said power line receptacle.

5. Testing apparatus for investigating the operation of an electrical appliance, said apparatus comprising a receptacle for receiving connections from a power line, a pair of receptacles for receiving the plug terminal of the appliance, a voltmeter, an ammeter, a wattmeter, circuit connections between said power line receptacle and said pair of appliance terminals, said circuit connections associating the ammeter winding with one of said pair of receptacles and the current winding of the wattmeter with the other of said pair of receptacles, leads connecting the voltage winding of said wattmeter across the contacts of said power line receptacle, and circuit elements including a switch connecting said voltmeter across the contacts of said power line receptacle.

6. Testing apparatus comprising a receptacle for connection to a power line, a pair of receptacles for the alternative reception of the plug terminal of an electrical appliance, a voltmeter, a multi-range wattmeter having a voltage coil and a pair of field coils, connections between said power line receptacle and said pair of receptacles, the connections to one receptacle including the higher range field coil and the connections to the other receptacle including the lower range field coil, and connections including switch means for shunting the voltmeter and the voltage coil of said wattmeter across the contacts of said power line receptacle.

7. The invention as set forth in claim 6, in combination with an additional appliance receptacle, an ammeter, and connections including said ammeter for supplying current to said additional receptacle from said power line receptacle.

8. Portable testing apparatus comprising a carrying case having a panel, a plurality of receptacles mounted on said panel, one of said receptacles being adapted to be connected to a power line, an ammeter, a double-range wattmeter having a scale graduated in watts and in operation costs, current supply leads between said power line receptacle and said other receptacles for connecting said ammeter in series with one of said other receptacles and the respective current windings, of said wattmeter in series with two other of said receptacles, a voltmeter, circuit elements including switch means for shunting said voltmeter and the voltage winding of said wattmeter across the contacts of said power line receptacle, a pair of terminals for receiving leads from probe electrodes, and switch means for connecting said voltmeter across said pair of terminals.

RAYMOND T. PIERCE.